United States Patent
Cheng

(10) Patent No.: US 6,804,123 B1
(45) Date of Patent: Oct. 12, 2004

(54) COMPUTER MAINFRAME WITH SUPERPOSED ARCHITECTURE

(75) Inventor: Wan Chen Cheng, Taipei (TW)

(73) Assignee: King Young Technology Co., Ltd., Taipei (TW)

( * ) Notice: Subject to any disclaimer, the term of this patent is extended or adjusted under 35 U.S.C. 154(b) by 55 days.

(21) Appl. No.: 10/403,000

(22) Filed: Apr. 1, 2003

(51) Int. Cl.[7] .................................................. G06F 1/16

(52) U.S. Cl. ...................... 361/784; 361/790; 361/803; 361/684; 361/683; 439/44; 439/47

(58) Field of Search ................................ 361/683–686, 361/724, 728–730, 735, 736, 825, 748, 752, 760, 784, 785, 790; 312/223.1, 223.2, 332.1, 333; 439/44, 47, 337

(56) References Cited

U.S. PATENT DOCUMENTS

| | | | | |
|---|---|---|---|---|
| 5,793,616 A | * | 8/1998 | Aubuchon et al. | 361/784 |
| 5,956,227 A | * | 9/1999 | Kitaoka | 361/695 |
| 5,987,553 A | * | 11/1999 | Swamy et al. | 710/301 |
| 6,707,684 B1 | * | 3/2004 | Andric et al. | 361/785 |

* cited by examiner

*Primary Examiner*—Darren Schuberg
*Assistant Examiner*—Anthony Q. Edwards

(57) ABSTRACT

A computer mainframe includes a housing, a motherboard, an intermediate circuit board, and a supporting bracket. A CD-ROM and a hard disk are attached to upper and lower sides, respectively, of the intermediate circuit board to sequentially superpose on and electrically connect to the motherboard via various connecting terminals provided at specific positions on the upper and the lower side of the intermediate circuit board. With the vertically superposed architecture of the mainframe, no space-occupying flat cable is needed for wiring the mainframe, enabling the mainframe to have a largely reduced volume.

11 Claims, 6 Drawing Sheets under assembly of a computer mainframe according to the present invention.

COMPUTER MAINFRAME WITH SUPERPOSED ARCHITECTURE

FIELD OF THE INVENTION

The present invention relates to a computer mainframe, and more particularly to a miniaturized computer mainframe having a vertically superposed architecture and accordingly a largely reduced volume.

BACKGROUND OF THE INVENTION

In this quickly developed information age, electronic data processing has become a common thing forming part of people's life. Meanwhile, the result of processing data electronically has completely changed the traditional manner of data storage. More specifically, the storing media for electronic data has been constantly reduced in volume in the process of miniaturization thereof.

The forms of storing or recording media for data have largely changed from paper to microfilms, hard disks, various kinds of floppy disks, compact disks, etc. to reduce the volume of storing medium by thousands or even tens of thousands of times. However, there is not any apparent development in the miniaturization of apparatus for electronic data processing. Taking the mainframe for a desktop personal computer as an example, its overall volume is almost not reduced by any degree in the last ten years. The development of a notebook computer only reduces an overall volume of a desktop computer by several times, which is largely lagging behind the miniaturization of the storing (recording) media. For most personal computer users, it is doubtlessly desirable if a computer system having a largely reduced mainframe could be developed to minimize unnecessary waste of working space by a large-size mainframe.

Most of the currently commercially available computer mainframes have a large volume mainly because they have radiating element and motherboard with large volume, use power supplier and floppy disk drive, have improperly arranged components, and use flat cables for wiring thereof. The improperly arranged components and the flat cables usually unnecessarily occupy the most part of space in the mainframe. The space for the flat cables to connect the motherboard to compact disk read-only memory (CD-ROM), hard disk, CD-recordable (CD-R), power supplier, floppy disk drive, etc. even exceeds an overall volume of the motherboard, CD-ROM, hard disk, etc. This is the main reason for a computer mainframe to have a large volume.

One of many ways to minimize the use of flat cables is to use small-size motherboard and externally connected transformer to reduce the space needed by the flat cables and shorten the distances between all components arranged in the mainframe. In this manner, the volume of the mainframe could be doubtlessly largely reduced.

It is therefore tried by the inventor to develop a miniaturized motherboard on which different parts and components are arranged in a manner, such as being vertically superposed on one another, to most effectively reduce the space necessary for these parts and components and thereby enable omission of the flat cables to avoid unnecessary waste of space in the computer mainframe.

SUMMARY OF THE INVENTION

A primary object of the present invention is to provide a computer mainframe having vertically superposed architecture to largely reduce an overall volume thereof and therefore enables miniaturization of the computer mainframe. To achieve the above and other objects, the computer mainframe of the present invention mainly includes:

a housing provided at predetermined positions with at least one CD-ROM gate and a plurality of openings;

a motherboard disposed in the housing and having first and second connecting terminals spaced thereon for connecting to a hard disk and a CD-ROM, respectively;

an intermediate circuit board adapted to superpose on the motherboard with the hard disk connected to a lower side and the CD-ROM to an upper side of the intermediate circuit board; the intermediate circuit board being provided at the lower side with third and fourth connecting terminals for engaging with the first and the second connecting terminal, respectively, and a hard disk connecting terminal electrically connected to the third connecting terminal, and at the upper side with a CD-ROM connecting terminal electrically connected to the second connecting terminal; the hard disk connecting terminal being adapted to engage with a connecting terminal provided on the hard disk, and the CD-ROM connecting terminal being adapted to engage with a connecting terminal provided on the CD-ROM; and a supporting bracket being superposed on the intermediate circuit board for firmly fixing the CD-ROM and the hard disk to the upper and the lower side, respectively, of the intermediate circuit board.

Wherein the intermediate circuit board and the supporting bracket are correspondingly provided on respective surfaces with a plurality of through holes, through which screws are extended into a plurality of standard threaded holes provided on a top surface of the hard disk, so as to firmly fasten the hard disk to the intermediate circuit board.

Moreover, the supporting bracket is provided at two lateral sides with two angled sideboards for fitly attaching to two lateral sides of the CD-ROM. The two sideboards of the supporting bracket are provided on respective surfaces with a plurality of through holes, through which screws are extended into a plurality of standard threaded holes provided at two lateral sides of the CD-ROM, so as to firmly fasten the CD-ROM to the supporting bracket and the intermediate circuit board.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
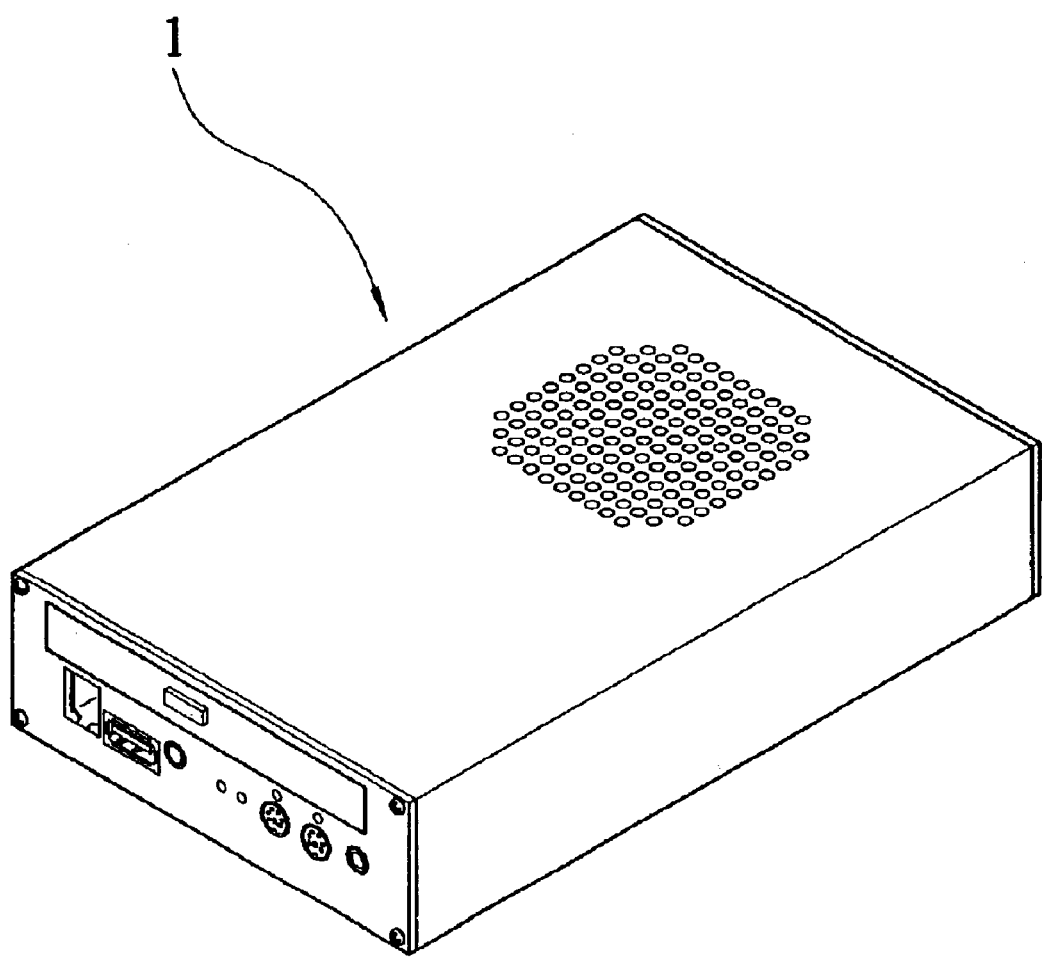
FIG. 1 is an assembled perspective view of a computer mainframe according to the present invention.
Figure 2:
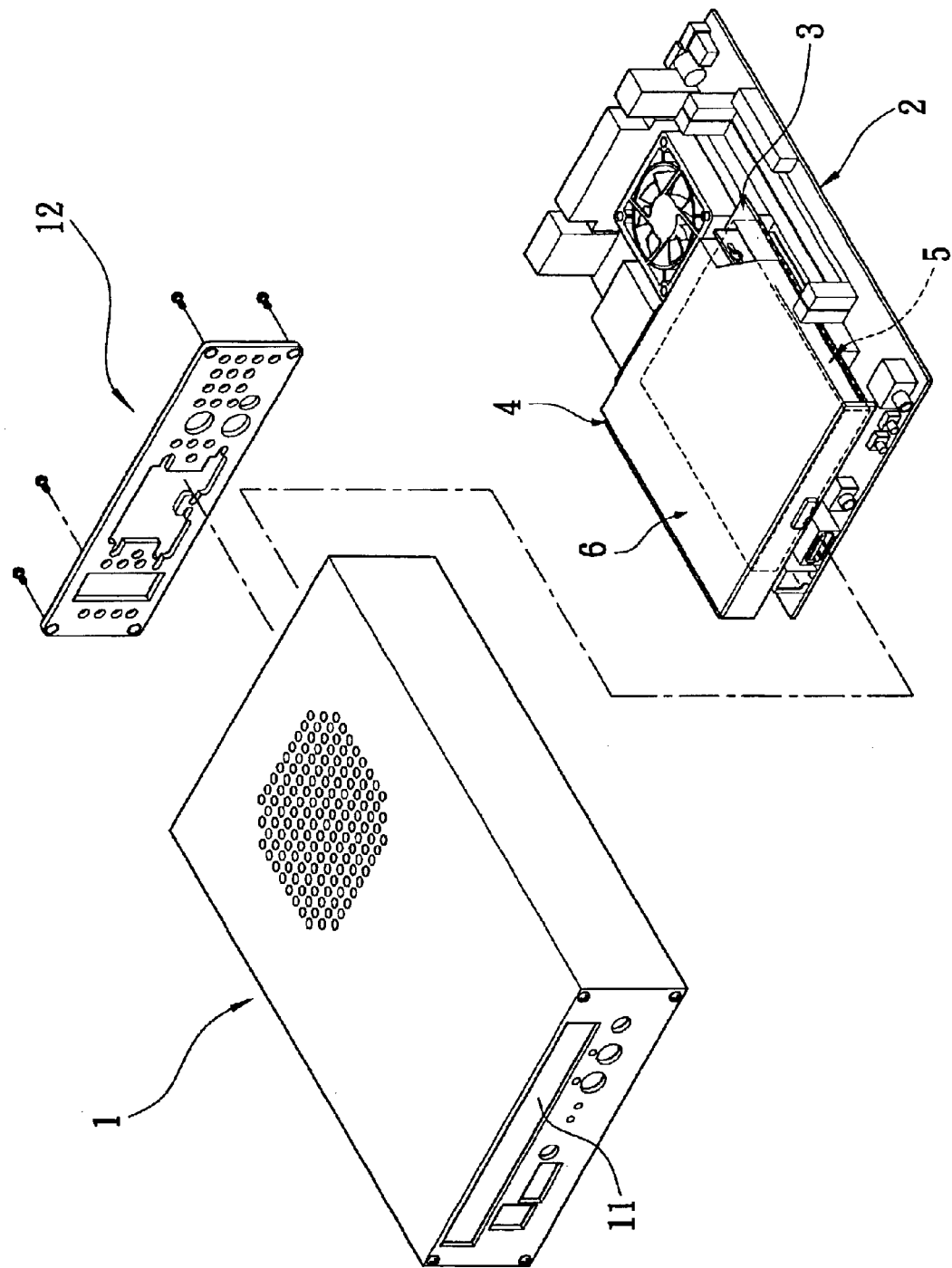
FIG. 2 is a partially exploded perspective view of the computer mainframe of FIG. 1.
Figure 3:
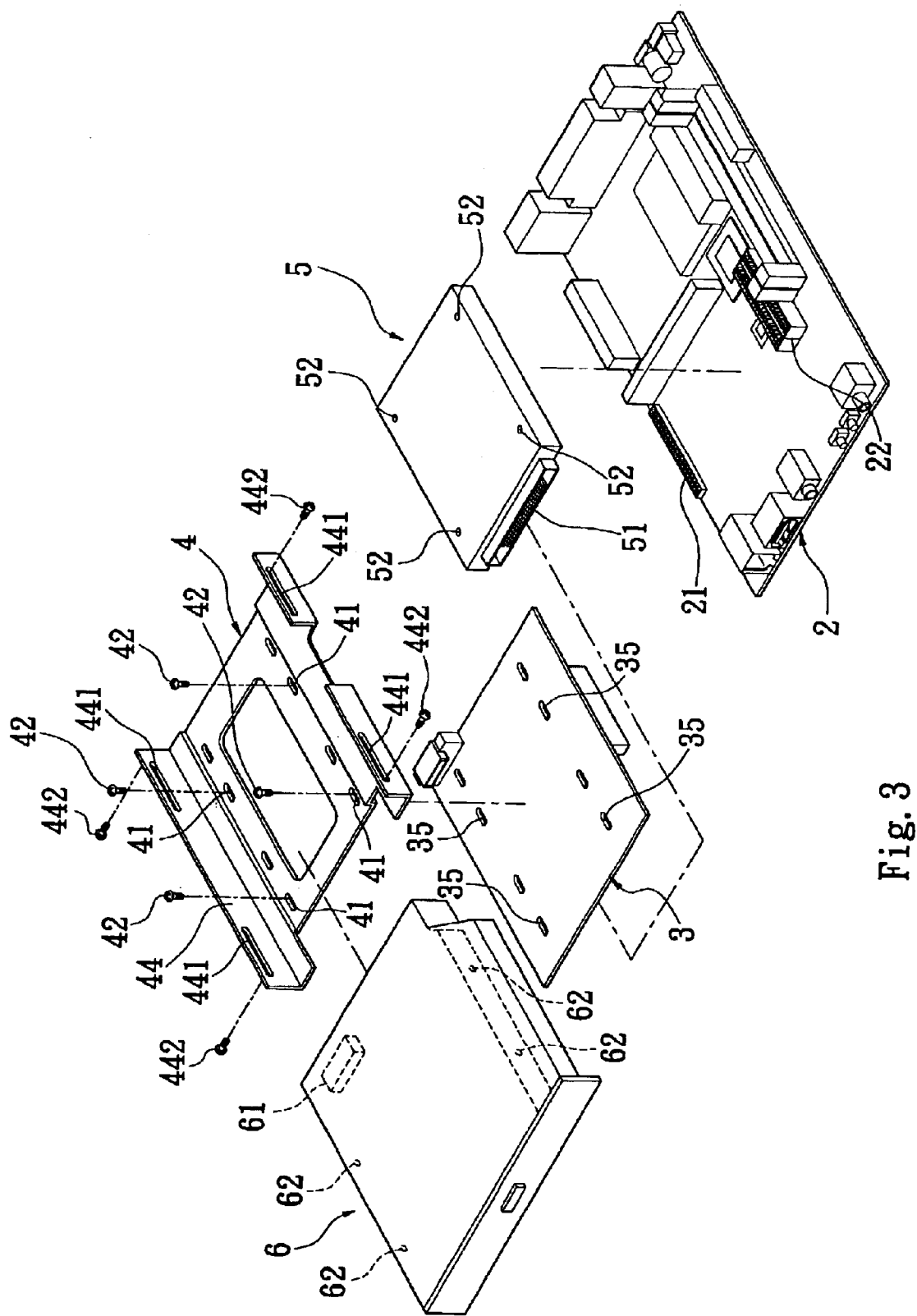
FIG. 3 is a fully exploded perspective view of the computer mainframe of FIG. 1 with a housing and a back cover plate removed therefrom.

Please refer to FIGS. 1, 2 and 3 that are assembled, partially exploded, and fully exploded perspective views, respectively, of a computer mainframe according to the present invention. As shown, the computer mainframe of the present invention mainly includes a housing 1, a motherboard 2, an intermediate circuit board 3, a supporting bracket 4, a hard disk 5, and a CD-ROM 6.

The housing 1 is provided at a front side with a CD-ROM gate 11 and a plurality of openings corresponding to different connectors provided at a front end of the motherboard 2, and at a rear side with a removable back cover plate 12. The back cover plate 12 is provided with a plurality of openings corresponding to different connectors provided at a rear end of the motherboard 2, and a plurality of air vents. Since the computer mainframe of the present invention is a miniaturized product, it requires a cooling fan to guide heat produced by the computer during operation to the air vents provided on the back cover plate 12 to ensure an enhanced radiation efficiency thereof.

The motherboard 2 is disposed in the housing 1 and includes, in addition to various kinds of connectors, universal serial bus, and control chips that are usually provided on most currently available motherboards, a first connecting terminal 21 and a second connecting terminal 22 that are parallelly spaced by a distance slightly larger than a width of the hard disk 5.

The intermediate circuit board 3 is superposed on the motherboard 2 with the hard disk 5 connected to a lower side thereof.

The supporting bracket 4 is superposed on the intermediate circuit board 3 for supporting the CD-ROM 6 thereon.

Figure 4:
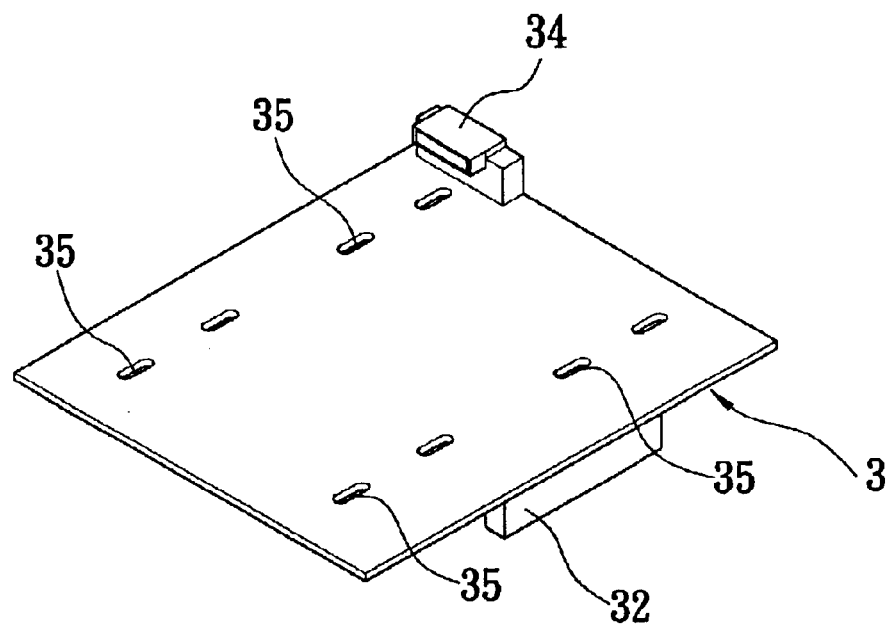
FIG. 4 is a top perspective view of an intermediate circuit board included in the present invention.
Figure 5:
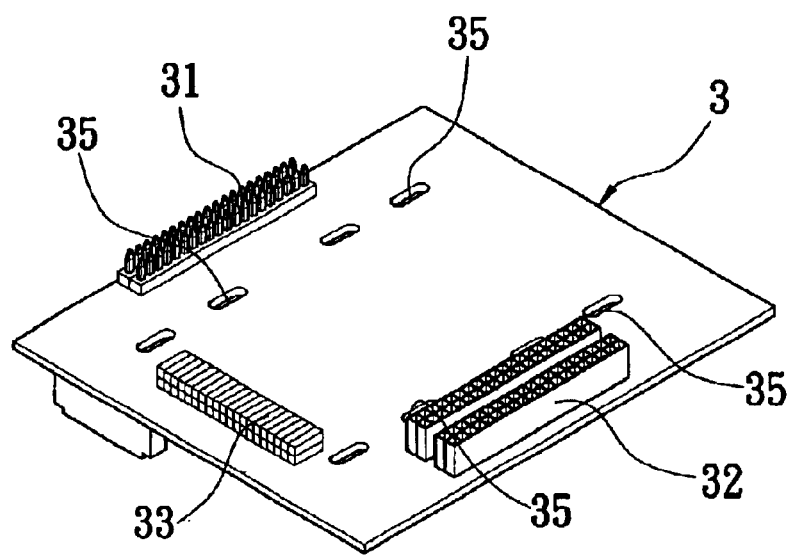
FIG. 5 is a bottom perspective view of the intermediate circuit board of FIG. 4.
Figure 6:
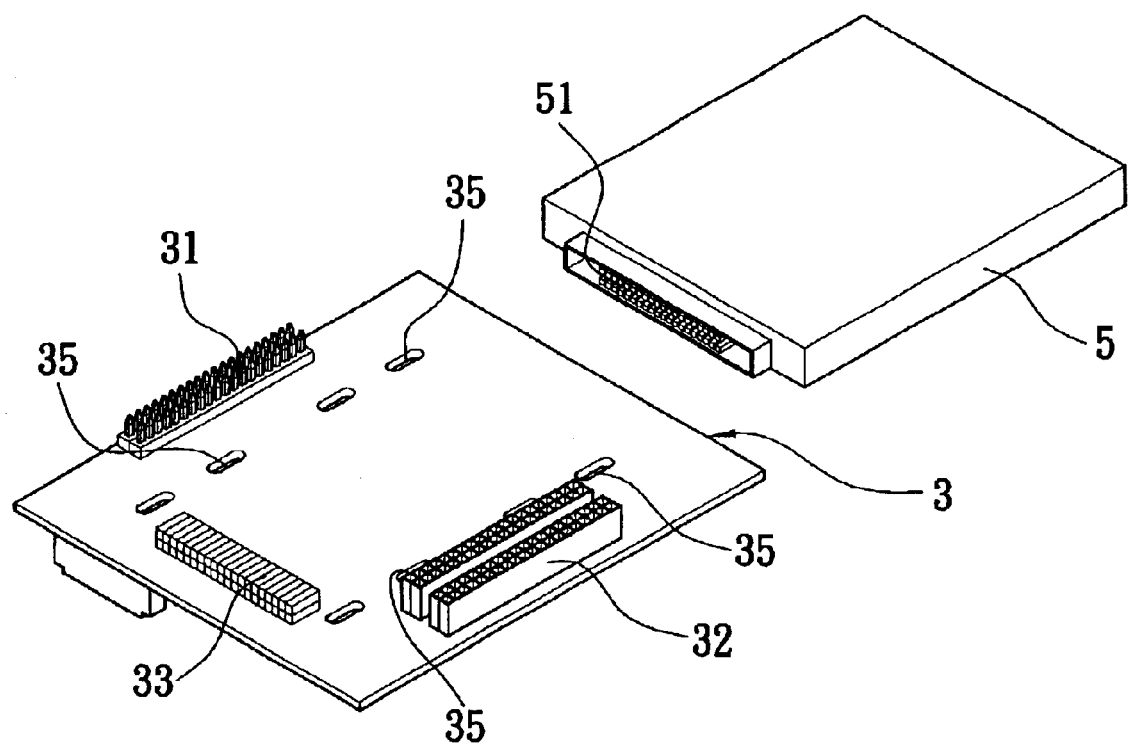
FIG. 6 shows the manner of connecting a hard disk to the intermediate circuit board of FIG. 4.

Please refer to FIGS. 4 and 5 that are top and bottom perspective views, respectively, of the intermediate circuit board 3 of the present invention. As shown, the intermediate circuit board 3 is provided at a lower side with parallelly spaced third and fourth connecting terminals 31, 32 corresponding to and adapted to engage with the first and the second connecting terminals 21, 22, respectively. Again, a distance between the third and the fourth connecting terminals 31, 32 is slightly larger than the width of the hard disk 5. The intermediate circuit board 3 is also provided at the lower side with a hard disk connecting terminal 33 electrically connected to the third connecting terminal 31. A CD-ROM connecting terminal 34 is provided on an upper side of the intermediate circuit board 3 to electrically connect to the fourth connecting terminal 32. Please refer to FIG. 6, the hard disk connecting terminal 33 is adapted to engage with a connecting terminal 51 on the hard disk 5. And, as can be seen from FIG. 3, the CD-ROM connecting terminal 34 is adapted to engage with a connecting terminal 61 on the CD-ROM 6. Furthermore, the intermediate circuit board 3 is provided on its surface with a plurality of through holes 35 corresponding to a plurality of standard threaded holes 52 provided on the hard disk 5.

Figure 7:
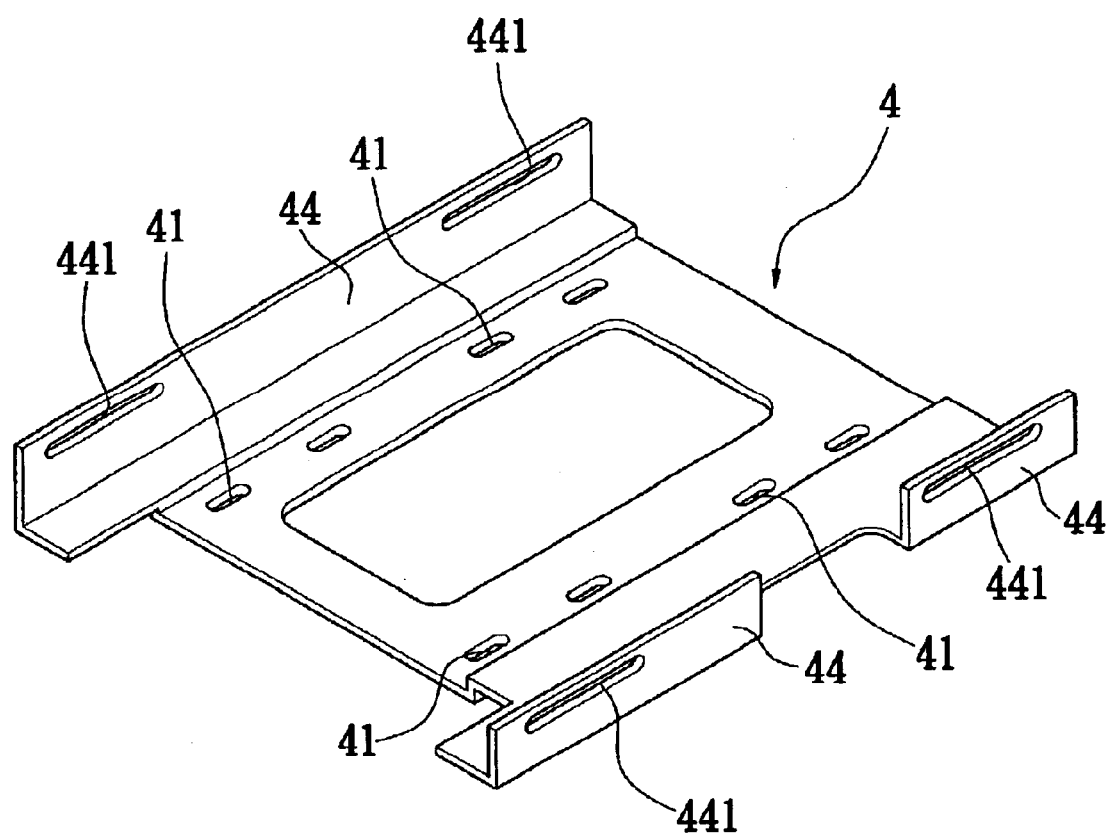
FIG. 7 is a top perspective view of a supporting bracket included in the present invention.

FIG. 7 is a perspective view of the supporting bracket 4 of the present invention. As shown, the supporting bracket 4 is provided on its surface with a plurality of through holes 41 corresponding to some of the through holes 35 on the intermediate circuit board 3, and at two lateral sides with two angled sideboards 44. Please also refer to FIG. 3. The two sideboards 94 of the supporting bracket 4 is spaced from each other by a distance equal to a width of the CD-ROM 6 for fitly attaching to two lateral sides of the CD-ROM 6. The sideboards 44 are also provided on their surfaces with a plurality of through holes 441, via which screws 442 may be extended to screw into standard threaded holes 62 correspondingly provided on two lateral sides of the CD-ROM 6 to connect the CD-ROM 6 to the supporting bracket 4.

Please refer to FIGS. 1, 2, 3 and 5 at the same time. The above-mentioned parts for the computer mainframe of the present invention are assembled together in the following sequence.

Step 1: First position the hard disk 5 on the lower side of the intermediate circuit board 3, which is now positioned upside down, engage the connecting terminal 51 with the hard disk connecting terminal 33 at the lower side of the intermediate circuit board 3, align the standard threaded holes 52 on the hard disk 5 with corresponding through holes 35 on the intermediate circuit board 3, and turn the intermediate circuit board 3 and the hard disk 5 over at the same time.

Step 2: Superpose the supporting bracket 4 on the intermediate circuit board 3, extend four screws 42 through corresponding through holes 41 and 35 on the supporting bracket 4 and the intermediate circuit board 3, respectively, into the standard threaded holes 52 on the hard disk 5, so that the supporting bracket 4 is fixed to the upper side of the intermediate circuit board 3 and the hard disk 5 is firmly connected to the lower side of the intermediate circuit board 3.

Step 3: Superpose the intermediate circuit board 3 on the motherboard 2 with the third and the fourth connecting terminal 31, 32 at the lower side of the intermediate circuit board 3 aligned with and inserted into the first and the second connecting terminal 21, 22, respectively, on the motherboard 2, so that the intermediate circuit board 3 is electrically connected to the motherboard 2.

Step 4: Superpose the CD-ROM 6 on the supporting bracket 4 and engage the connecting terminal 61 with the CD-ROM connecting terminal 34 on the upper side of the intermediate circuit board 3, extend the screws 442 through the through holes 441 on the supporting bracket 4 into the standard threaded holes 62 on two lateral sides of the CD-ROM 6, so that the CD-ROM 6 is located above the supporting bracket 4 and electrically connected to the intermediate circuit board 3.

Step 5: Insert the motherboard 2 having the above parts superposed thereon into the housing 1 with a front end of the CD-ROM 6 aligned with the CD-ROM gate 11 at the front side of the housing 1 and various connectors at the front end of the motherboard 2 aligned with the openings provided at the front side of the housing 1, and then fasten the back cover plate 12 to the rear side of the housing 1 with various connectors at the rear end of the motherboard 2 aligned with corresponding openings on the back cover plate 12 to complete the whole assembling of the computer mainframe of the present invention.

In the above-described assembling procedures, the Step 3 may be otherwise performed after the Step 5 without adversely affecting the convenience in assembling the whole mainframe.

From the above description, it may be found the computer mainframe of-the present invention has a vertically superposed architecture. When a computer mainframe having this vertically superposed architecture is used with an externally connected transformer to supply necessary power as in the case of a notebook computer, flat cables that often unnecessarily occupy a lot of space in the mainframe for wiring could now be omitted to largely reduce an overall volume of the computer mainframe to enable the miniaturization thereof. A prototype of the computer mainframe of the present invention has been produced to have an actual size of 24.8 cm×14.8 cm×4.2 cm (see the Attachment No. 1), which is substantially close to the size of a CD-ROM for a general desktop computer mainframe, and is about 23 times smaller than a conventional desktop computer mainframe that typically has a size of 45 cm×20 cm×40 cm. The computer mainframe of the present invention therefore hasa largely reduced volume to enable highly practical use of it in the industrial field.

What is claimed is:

1. A computer main frame having superposed architecture, comprising:

a housing provided at predetermined positions with at least one CD-ROM gate and a plurality of openings for different connectors;

a motherboard disposed in said housing and having first and second connecting terminals spaced thereon for connecting to a hard disk and a CD-ROM, respectively;

an intermediate circuit board adapted to superpose on said motherboard with said hard disk connected to a lower side and said CD-ROM to an upper side of said intermediate circuit board; said intermediate circuit board being provided at said lower side with third and fourth connecting terminals for engaging with said first and said second connecting terminal, respectively, and a hard disk connecting terminal electrically connected to said third connecting terminal, and at said upper side with a CD-ROM connecting terminal electrically connected to said second connecting terminal; said hard disk connecting terminal being adapted to engage with a connecting terminal provided on said hard disk, and said CD-ROM connecting terminal being adapted to engage with a connecting terminal provided on said CD-ROM; and a supporting bracket superposed on said intermediate circuit board for firmly fixing said CD-ROM and said hard disk to said upper and said lower side, respectively, of said intermediate circuit board.

2. The computer mainframe having superposed architecture as claimed in claim 1, wherein said intermediate circuit board and said supporting bracket are correspondingly provided on respective surfaces with a plurality of through holes, through which screws are extended into a plurality of standard threaded holes provided on a top surface of said hard disk.

3. The computer mainframe having superposed architecture as claimed in claim 1, wherein said first and second connecting terminals on said motherboard are parallelly spaced from each other.

4. The computer mainframe having superposed architecture as claimed in claim 1, wherein said first and second connecting terminals on said motherboard are parallelly spaced from each other by a distance slightly larger than a width of said hard disk.

5. The computer mainframe having superposed architecture as claimed in claim 3, wherein said first and second connecting terminals on said motherboard are parallelly spaced from each other by a distance slightly larger than a width of said hard disk.

6. The computer mainframe having superposed architecture as claimed in claim 1, wherein said third and fourth connecting terminals on said intermediate circuit board are parallelly spaced from each other.

7. The computer mainframe having superposed architecture as claimed in claim 1, wherein said third and fourth connecting terminals on said intermediate circuit board are parallelly spaced from each other by a distance slightly larger than a width of said hard disk.

8. The computer mainframe having superposed architecture as claimed in claim 6, wherein said third and fourth connecting terminals on said intermediate circuit board are parallelly spaced from each other by a distance slightly larger than a width of said hard disk.

9. The computer mainframe having superposed architecture as claimed in claim 1, wherein said supporting bracket is provided at two lateral sides with two angled sideboards for fitly attaching to two lateral sides of said CD-ROM.

10. The computer mainframe having superposed architecture as claimed in claim 9, wherein a distance between said two sideboards of said supporting bracket is equal to a width of said CD-ROM.

11. The computer mainframe having superposed architecture as claimed in claim 9, wherein said two sideboards of said supporting bracket are provided on respective surfaces with a plurality of through holes, through which screws are extended into a plurality of standard threaded holes provided at two lateral sides of said CD-ROM.

* * * * *